US011960932B2

(12) United States Patent
Fink et al.

(10) Patent No.: US 11,960,932 B2
(45) Date of Patent: Apr. 16, 2024

(54) TARGET DISTRIBUTION OF RESOURCES DETERMINED ON A BASIS OF AN OPTIMIZATION PARAMETERIZATION

(71) Applicant: Siemens Aktiengesellschaft, Munich (DE)

(72) Inventors: Rafael Fink, Munich (DE); Corinna Gottschalk, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 505 days.

(21) Appl. No.: 17/264,974

(22) PCT Filed: Sep. 18, 2018

(86) PCT No.: PCT/EP2018/075175
§ 371 (c)(1),
(2) Date: Feb. 1, 2021

(87) PCT Pub. No.: WO2020/057725
PCT Pub. Date: Mar. 26, 2020

(65) Prior Publication Data
US 2021/0326180 A1   Oct. 21, 2021

(51) Int. Cl.
*G06F 9/46* (2006.01)
*G06F 9/50* (2006.01)

(52) U.S. Cl.
CPC .......... *G06F 9/5011* (2013.01); *G06F 9/5027* (2013.01); *G06F 9/5061* (2013.01)

(58) Field of Classification Search
CPC ..... G06F 9/5011; G06F 9/5027; G06F 9/5061
See application file for complete search history.

(56) References Cited

PUBLICATIONS

International Search Report and Written Opinion in corresponding PCT Patent Application No. PCT/EP2018/075175 dated Feb. 4, 2019. 12 pages.
Wikipedia: "Cloud Computing", Internet Article, XP055547771, Gefunden im Internet: URL:https://de.wikipedia.org/w/index.php?title=Cloud Computing&oldid=180667588, [gefunden am Jan. 25, 2019], pp. 1-10; 2018; 16 pages.
(Continued)

*Primary Examiner* — Gregory A Kessler
(74) *Attorney, Agent, or Firm* — Schmeiser, Olsen & Watts LLP

(57) ABSTRACT

A method for resource management includes: providing a representation of a set of resources; obtaining a set of use requests, wherein a use request can be fulfilled by allocating a resource to the use request; wherein the resources are categorized into resource classes, so that resources in a resource class are interchangeable with respect to fulfilling a use request; wherein a use request can be fulfilled for a specific use period requested by the use request, by allocating a resource to a resource class requested by the use request; wherein a target distribution of resources for use requests is determined on the basis of an optimization parameterization; wherein the optimization parameterization is based on weightings of allocations of resources to use requests; wherein, further, to determine the target distribution, a starting solution is created that represents a distribution of resources for use requests, is provided.

12 Claims, 2 Drawing Sheets

(56) References Cited

PUBLICATIONS

A. Hertz, et al., "A solution method for a car fleet management problem with maintenance constraints," Journal of Heuristics 15(5) (2009); 26 pages.
B.B. Oliviera, et al.,"Fleet and revenue management in car rental companies: A literature review and an integrated conceptual framework," Omega 71(2017); 16 pages.

TARGET DISTRIBUTION OF RESOURCES DETERMINED ON A BASIS OF AN OPTIMIZATION PARAMETERIZATION

CROSS-REFERENCE TO RELATED APPLICATIONS

This application is a national stage entry of PCT Application No. PCT/EP2018/075175 having a filing date of Sep. 18, 2018, the entire contents of which are hereby incorporated by reference.

FIELD OF TECHNOLOGY

The following relates to the management of resources, in particular using a heuristic approach to optimize operation of physical resources or equipment. In one variant there is provision for a heuristic method for optimizing the operation of a motor vehicle fleet.

BACKGROUND

Resource management approaches, for example for fleets, in which for example rental cars need to be distributed according to rental requests, are described for example in B. B. Oliviera et al., "Fleet and revenue management in car rental companies: A literature review and an integrated conceptual framework", Omega 71(2017) or A. Hertz, D. Schindl, N. Zufferey: "A solution method for a car fleet management problem with maintenance constraints", Journal of Heuristics 15(5) (2009). These approaches have little suitability for large fleets and require considerable processing power and processing time. Similar resource management problems can also arise when operating other equipment, such as for example power stations or production facilities.

SUMMARY

It is an aspect of the present invention to provide efficient resource management for resources that is able to be implemented with little computational outlay. According to the embodiment of the present invention, resources that can only be used to meet one request at any time are intended to be distributed as efficiently as possible, for example in order to achieve as high a level of production or as high a level of profit as possible, or to keep down costs.

The embodiment of the present invention provides a method for resource management. The method comprises providing a representation of a set of resources and receiving a set of use requests. A use request is, and/or the use requests are each, able to be met by allocating a resource to the use request. The resources are categorized into resource classes such that resources of one resource class are interchangeable for meeting a use request. A use request is, and/or the use requests are each, able to be met in particular by allocating a resource of a resource class requested by the use request for a specific period of use requested by the use request. A target distribution of resources to use requests is determined on the basis of an optimization parameterization, wherein the optimization parameterization is based on weightings of allocations of resources to use requests. Furthermore, to determine the target distribution, a starting solution is created that represents a distribution of resources to use requests, each use request having an allocation to precisely one resource. The target distribution is determined from the starting solution by moving one or more allocations from or to at least one resource in one or more movement steps on the basis of an optimization for the optimization parameterization. It has been found that optimization of the target distribution quickly becomes possible with just a few movement steps, only low processing power being required. Furthermore, the computational effort can easily be adjusted for example by stipulating the depth of recursion of the movement steps. The method can be performed on a processing device, in particular on a system having limited processing power, for example a laptop, and can determine a target distribution quickly and efficiently.

Additionally, there is provision for a processing device having a processing circuit and a memory connected thereto. The processing circuit is designed to provide a representation of a set of resources and to receive a set of use requests. A use request is able to be met by allocating a resource to the use request. The resources are categorized into resource classes so that resources of one resource class are interchangeable for meeting a use request. A use request is able to be met by allocating a resource of a resource class requested by the use request for a specific period of use requested by the use request. The processing circuit is furthermore designed to determine a target distribution of resources to use requests on the basis of an optimization parameterization, wherein the optimization parameterization is based on weightings of allocations of resources to use requests. Furthermore, to determine the target distribution, a starting solution is created that represents a distribution of resources to use requests, each use request having an allocation to precisely one resource. The target distribution is determined from the starting solution by moving one or more allocations from or to at least one resource in one or more movement steps on the basis of an optimization for the optimization parameterization.

A weighting of an allocation of a resource to a use request can be based for example on revenue and/or costs and/or profit and/or length of the period of use and/or position of the period of use and/or class size of the resource class of the resource and/or prioritization information. In general, a weighting can be based on one or more weighting parameters and/or relate to one or more allocations of use requests to a resource. The class size can parameterize the number of resources in a resource class, for example explicitly or implicitly, for example relative to the size of a comparison class. A weighting can be based on the ratio of class size to period of use, for example. A weighting may be depictable as a function of partial weights, for example may be obtained as the sum and/or product of partial weights. Every allocation can have an associated weighting. In general, a weighting can be based on the resource and/or resource class and/or the use request and/or external parameters. A weighting can generally represent a weight for comparison with other weights, for example as an absolute value or as a relative value, for example in relation to a comparison weight. An optimization parameterization can represent a sum of weights that is intended to be for example maximized and/or increased, or minimized and/or reduced, for the optimization. There may be provision for different allocations to involve different parameters. For example certain vehicle classes can involve the use of customer-related parameters that are not available for other vehicle classes. In other cases, it is possible to take into consideration lead times or handover times that are available for certain installation types but not for others, for example when comparing smelting furnaces of different type and/or size. There may generally be provision for a weighting to be based on a temporal overlap between use requests allocated to the resource. In general there may be a temporal overlap if requested periods of use in multiple use requests allocated to one resource have a temporal overlap at least in part. Transfer periods can be taken into consideration in this case, for example the time needed for handing over a motor vehicle or for reconfiguring an installation, for example by virtue of the periods of use being adapted accordingly, for example extended, and/or an overlap being determined accordingly. A reference to an overlap between use requests can be understood to mean a reference to the temporal overlap between requested periods of use in the requests, in particular in relation to the same resource when it is allocated. The weighting allows a multiplicity of conditions for the allocation of resources to be taken into consideration.

There may be provision for a use request to be able to be met by allocating a resource of at least one other resource class. For example, there may be provision for the other resource class to contain or represent higher-quality resources, for example more powerful or more expensive machinery or vehicles.

The resources may, in particular, be physical resources. There may generally be provision for each resource to be able to be physically allocated only to one use request at any time, for example according to the target distribution. In other resource distributions, for example a starting distribution or intermediate distribution, temporal overlaps between the periods of use allocated to the resource can arise for one or more resources each time.

There may be provision for the resources to be operating equipment, in particular vehicles, machines or production plants. Resources of the set of resources may be of comparable type and/or can have comparable functionality, for example as vehicles such as motor vehicles, or motorcycles, or production lines for manufacturing similar or like products. It is conceivable for maintenance times to be represented by appropriate use requests. Alternatively or additionally, there may be provision for a weighting to be based on maintenance times.

The method can comprise operating the resources according to the target distribution. Operating the resources can comprise handing over and/or providing the resources according to the target distribution in line with the use requests, for example by means of appropriate instructions and/or handover. In some cases, operation can comprise controlling resources and/or providing supplies such as fuel and/or raw materials for products and/or energy, for example by means of appropriate ordering and/or control. In this connection, the supplies are provided for consumption by the resources, which can represent devices and installations.

In order to determine a target distribution it is possible for the starting solution to be taken as a basis for performing movement steps for each of the resources for a number of iterations I, wherein I is at least 1, until an optimization appears on the basis of the optimization parameterization, or an optimization has not been found. A resource distribution can be determined following progressive coverage of all resources in an iteration. If the iteration is terminated, this resource distribution can be used as the target distribution; if continued, a further optimization can be performed in a new iteration based on the resource distribution, this resource distribution being able to be regarded as an intermediate distribution or adapted starting solution. I may be stipulated or dynamically adapted, for example based on an achieved optimization, which can be determined for example by comparing the optimization parameterization for a resource distribution with a target value, for example a minimum or maximum value. Accordingly, selection of I allows a balance to be found between computational effort and optimization. Movement steps can be performed by checking whether there is an optimization for one or more movement steps each time. If there is an optimization for a step or a chain of steps, the distribution under consideration can be changed accordingly so that the changed distribution is taken into consideration for resources considered subsequently.

In some cases, determining the target distribution can comprise taking the optimization parameterization for resources having allocated use requests with temporally overlapping periods of use as a basis for allocating use requests to resources from a second set of resources that are not contained in the set of resources. Such resources may be external resources that can be purchased from external suppliers, for example. The purchase of such resources is normally associated with inefficiency or costs or loss of profit, for example because use requests are assigned to external suppliers or products are bought in. The optimization parameterization may be designed to minimize the allocation of resources from the second set, or associated costs or inefficiencies. In particular, the optimization parameterization can represent a sum of weighted temporal overlaps.

The target distribution can be determined such that there are no temporal overlaps between the periods of use in the use requests allocated to a resource. The target distribution can therefore be implemented by means of the physical resources. There may be provision for the target distribution to meet all requests, for example by means of resources from the set of resources, and/or by means of resources from the second set.

There may be provision for a processing device designed to perform a method described herein. A processing device can generally comprise processing logic, and/or processing circuits, and/or memories, which are operable in order to perform the method. There may be provision for the processing device to represent a single system or a distributed system, for example one or more computers, and/or to be implemented as a cloud system. A processing logic unit can comprise an integrated circuit and/or one or more processors and/or controllers and/or ASICs (application-specific integrated circuit) or similar logic units or circuits. A memory or storage device, also referred to as a storage medium, can comprise volatile or nonvolatile memories, for example RAM (random access memory) and/or optical memories and/or magnetic memories and/or Flash and/or NAND (Not AND) memories, etc. There may generally be provision for a storage medium that stores instructions suitable for prompting a processing device to perform the method described herein. The storage medium may, in particular, be a nonvolatile and/or nontransitory medium. A computer program that contains such instructions is described. The computer program can contain modules in order to perform the actions and/or steps of the method, in particular a representation module, and/or a request module, and/or a distribution module, which can, in particular, contain one or more submodules, for example a movement module and/or an optimization module.

BRIEF DESCRIPTION

Some of the embodiments will be described in detail, with reference to the following figures, wherein like designations denote like members, wherein.

DETAILED DESCRIPTION

Figure 1:
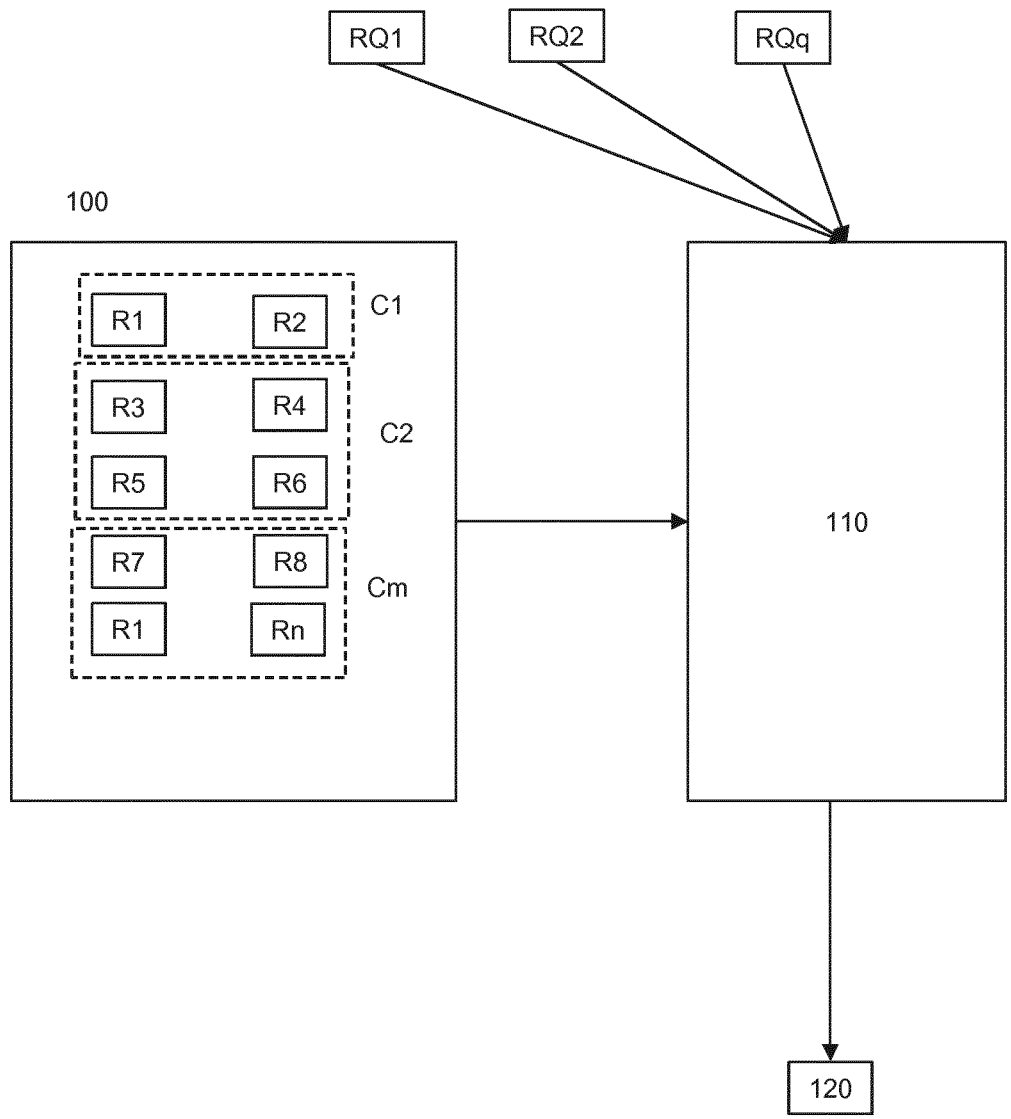
FIG. 1 depicts an approach for resource management.

FIG. 1 shows an illustrative approach for resource management. The resources R1, ..., Rn to be handled are represented in a set 100 of resources, for example provided in a database or table or another representation. The representation may be provided by being provided in a memory and/or by means of reception of appropriate input and/or reading of information. The resources R1, ..., Rn may, in particular, be vehicles of a vehicle fleet, or rental cars, which are ready at a location. There may be provision for resources to be generally available at the same location again at the end of a use, for example because vehicles or tools or mobile equipment are returned, or the resources themselves are stationary, for example industrial installations such as production plants or manufacturing installations. The resources are categorized into resource classes C1, ..., Cm. Each resource class can comprise one or more resources. Different resource classes can have different sizes, for example different numbers of resources in the class. It can be assumed that each resource representation has an applicable physical equivalent.

Use requests RQ1, ..., RQq need to be met by virtue of resources being provided accordingly. A use request RQ1, ..., RQq can, in particular, indicate which resource class is requested when and/or for what period of use. A period of use can represent an uninterrupted period. Depending on the resource type, the period may be of any length and/or may be indicated in any resolution, for example hour, minutes, days, etc. The aim of the resource management is to meet all requests as efficiently as possible, for example with maximized profit. Additional priority information may be available that can indicate for example priority for certain use requests or associated projects or customers, and/or whether there is a maintenance period to be observed, and/or whether other priorities need to be taken into consideration, for example on the basis of external parameters or conditions that, by way of example, are not specifically related to a resource and/or request. The use requests RQ1, ..., RQq may be represented as a set of use requests. A use request can be met by virtue of a resource of a requested resource class, and/or a requested resource, being provided for the requested period of use and/or operated in line with the request. In some cases, a resource of one resource class may be replaceable by a resource from another resource class, for example by a higher-quality resource, for example a more powerful or more luxurious vehicle. There may be provision for a map of permissible replacement between resource classes and/or resources to be available, on the basis of which a resource distribution can be performed. Alternatively or additionally there may be provision for no replacement to be able to be carried out between certain resource classes, for example from a higher-quality class to a low-quality class. By way of example there may be provision for a requested limousine not to be able to be replaced by a small car, but for a small car to be able to be replaced by a mid-range car or limousine. Other examples relating to industrial installations are conceivable. The use requests can be received or may be able to be received by means of input, reading from a memory and/or reception via communication means. A computer program implementing the present invention can contain appropriate modules.

An optimizer 110, which may be implemented in a processing device, is able to access the set 100 of resources R1, ..., Rn and the use requests RQ1, ..., RQq and to take these as a basis for determining a target distribution 120.

In order to determine a target distribution 120 it is possible for a starting solution to be determined, which can be regarded as an initial distribution. The starting solution can generally allocate use requests to resources that are able to meet the particular use request. Overlaps can arise in the process. A starting solution can be created for example by virtue of use requests being allocated to resources progressively or in succession in a suitable or random order. In particular there may be provision for weightings to be taken as a basis for progressively allocating, for each individual resource from the set of resources, as yet unallocated use requests to the particular resource such that an optimization is obtained without overlaps arising, and the request is met. A similar procedure is performed for subsequent resources by using the requests that still remain. If there are still use requests left after all resources have been allocated, these can be allocated in overlapping fashion, for example based on weighting of the overlap, for example in order to minimize said overlap. Alternatively it is possible for a starting solution to be determined in another way, for example by means of random distribution and/or by taking into consideration stored comparison solutions.

In general, an optimization parameterization can comprise all parameters and/or values and/or conditions used for optimization, in particular weightings. An optimization parameterization can be used for comparison or for optimization for a resource and allocated use requests, for example by means of comparison with a target value or threshold value or optimization value. As such it is possible, for example for a starting solution, for an optimization to be performed for individual resources, for example maximum profit when loaning rental cars. There may be provision for the optimization parameterization to alternatively or additionally relate to the determination of an optimization for a distribution overall, for example in order to optimize a target distribution and/or to determine intermediate distributions and/or movement steps.

Figure 2:
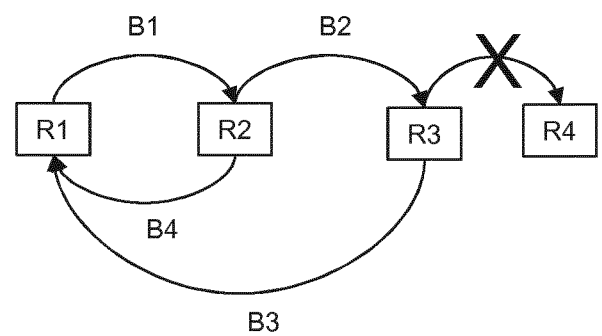
FIG. 2 depicts movements of allocations.

FIG. 2 shows, by way of illustration, movements according to the embodiment of the present invention that are able to be implemented as part of a local search or search heuristic. On the basis of a starting solution or intermediate distribution it is possible, for each resource, to look for possible movements of allocated requests to or from the resource that still meet the requests. The possible movements can be checked for whether they lead to an optimization or improvement of the distribution, for example on the basis of the optimization parameterization. In particular it is possible for optimization to be performed in respect of a sum of weighted overlaps. Any possible individual movement can potentially allow further movements, which means that a movement tree can be obtained that is dependent on the number t of steps under consideration. t may be defined or variable, for example changed between iterations I, or within one iteration. By way of example, t can rise as the number of resources for which movements have taken place within an iteration increases. t can be regarded as the depth of the search space or depth of recursion or number of permissible movements. FIG. 2 depicts possible movements B1-B4 for a resource R1 by way of illustration. Depending on the depth t, there may be provision for movements having concatenated movement steps, for example tß1 steps. Each step corresponds to a movement of an allocation of a request to another resource that is able to meet the request. The target (new resource) of one movement step may be the starting point for a next step. In some variants, each resource can be at most a target once and/or a starting point for a movement step once. There may be provision for each request to be reallocated or moved no more than once. Chains of movement steps having t+1 steps can be considered, which means that the initial resource of the first step may be identical to the target resource of the last step, and corresponds to the resource for which the optimization is performed. In FIG. 2, starting from the resource R1, for example movements or chains of (B1), (B1, B2), (B1, B4), (B1, B2, B3) are possible for t=2. One allocation to a request can be moved per movement step each time. There may be provision for the possible movements or chains to be checked progressively, for example with increasing length, for whether there is an optimization. If this is the case, the process can be aborted for this resource and continued with another resource, the optimized allocation being able to be retained as an intermediate result, which means that subsequent operations take place with an altered distribution. If there is no optimization available, a different chain of the same length starting from the same resource can be checked, if available, or a longer chain can be checked. If no optimization is found in any of the possible chains, and/or a processing condition expires, for example a maximum processing time, it is possible to move on to the next resource. When all of the possible resources have been checked, an iteration can be terminated. Instead of checking for the availability of an optimization, it is possible to check for attainment of a target optimization, which may be the same for all chains and/or chain lengths and/or resources, or which may be variable between chains and/or chain lengths and/or resources. An optimization can relate, in particular, to a weighted sum of overlaps for all resources of the distribution that is being progressively optimized.

After all resources have been covered and/or the iteration has been terminated, use requests can be allocated to other resources of permissible resource classes, for example by upgrading to a higher-quality class, or can be allocated to external resources, for example other service providers. This can be done on the basis of the optimization parameterization, which means that the best distribution between external resources and resources of the set 100 in respect of the optimization becomes possible. This allows a target distribution 120 to be determined.

It is conceivable, based on different starting solutions, for example a set of starting solutions, to perform the method described for each of these solutions. The target distributions obtained can be taken as a basis for selecting the best one. One or more time limits for optimization may be stipulated in this case, for example for the whole processing and for each starting solution.

A starting solution and/or an intermediate distribution can be taken as a basis for creating a list of resources with improvement potential that it is possible to work through progressively within an iteration. This list may be organized for example according to an order criterion such as resource class, and/or class size, and/or one or more optimization parameters such as profit allocated on the basis of the distribution and/or weighting sum and/or estimated improvement potential.

It is conceivable for the optimization parameterization to be adapted for different iterations or distribution, in particular in respect of the determination of the target distribution. As such, for example different parameters and/or priorities can be taken into consideration for determining the target distribution. The resource management can relate to a time frame that comprises the periods of use in all requests under consideration. The method can be performed on a rolling basis, for example at regular intervals, with altered sets of requests and/or resources being able to be used, for example because requests have been met, or are being met, or new requests have been made, or resources are unavailable or have been recently added.

Although the embodiment of the present invention has been illustrated and described more thoroughly in detail by means of the exemplary embodiment, the present invention is not limited by the disclosed examples, and other variations can be derived therefrom by a person skilled in the art without departing from the scope of protection of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method for resource management, comprising:
providing a representation of a set of resources; and
receiving a set of use requests, wherein a use request is able to be met by allocating a resource to the use request;
wherein the resources are categorized into resource classes so that resources of one resource class are interchangeable for meeting the use request;
wherein the use request is able to be met by allocating the resource of a resource class requested by the use request for a specific period of use requested by the use request;
wherein a target distribution of resources to use requests is determined on a basis of an optimization parameterization;
wherein the optimization parameterization is based on weightings of allocations of resources to use requests;
wherein, to determine the target distribution, a starting solution is created that represents a distribution of resources to use requests, each use request having an allocation to precisely one resource; and
wherein the target distribution is determined from the starting solution by moving one or more allocations from or to at least one resource in one or more movement steps on a basis of an optimization for the optimization parameterization;
wherein to determine the target distribution, the starting solution is taken as a basis for performing movement steps for each of the resources for a number of iterations I, wherein I is at least 1, until an optimization appears on the basis of the optimization parameterization, wherein a resource distribution is determined following progressive coverage of all resources in an iteration;
if an iteration is terminated, the resource distribution is used as the target distribution;
if the iteration is continued, a further optimization is performed in a new iteration based on the resource distribution to achieve an intermediate distribution;
wherein the number of iterations I is dynamically adapted by comparing the optimization parameterization for the resource distribution with a target value, such that a selection of iterations I balances computational effort and optimization;

wherein the performing movement steps includes checking whether there is an optimization for one or more movement steps each time, and if there is an optimization for a step or a chain of steps, the target distribution is changed accordingly so that a changed distribution is taken into consideration for resources considered subsequently.

2. The method as claimed in claim 1, wherein a weighting of an allocation of a resource to a use request is based on revenue and/or profit and/or costs and/or length of the period of use and/or position of the period of use and/or class size of the resource class of the resource and/or prioritization information.

3. The method as claimed in claim 1, wherein a use request is able to be met by allocating a resource of at least one other resource class.

4. The method as claimed in claim 1, wherein the resources are physical resources.

5. The method as claimed in claim 1, wherein the resources are operating equipment, vehicles, machines or production plants.

6. The method as claimed in claim 1, further comprising operating the resources according to the target distribution.

7. The method as claimed in claim 1, wherein determining the target distribution comprises taking the optimization parameterization for resources having allocated use requests with temporally overlapping periods of use as a basis for allocating use requests to resources from a second set of resources that are not contained in the set of resources.

8. The method as claimed in claim 1, wherein the target distribution is determined such that there are no temporal overlaps between the periods of use in the use requests allocated to a resource.

9. A processing device having a processing circuit and a memory connected thereto, wherein the processing circuit is designed to provide a representation of a set of resources and to receive a set of use requests, wherein a use request is able to be met by allocating a resource to the use request;
   wherein the resources are categorized into resource classes so that resources of one resource class are interchangeable for meeting the use request;
   wherein the use request is able to be met by allocating a resource of a resource class requested by the use request for a specific period of use requested by the use request;
   wherein the processing circuit is designed to determine a target distribution of resources to use requests on a basis of an optimization parameterization; wherein the optimization parameterization is based on weightings of allocations of resources to use requests; wherein, to determine the target distribution, a starting solution is created that represents a distribution of resources to use requests, each use request having an allocation to precisely one resource; and
   wherein the target distribution is determined from the starting solution by moving one or more allocations from or to at least one resource in one or more movement steps on a basis of an optimization for the optimization parameterization;
   wherein to determine the target distribution, the starting solution is taken as a basis for performing movement steps for each of the resources for a number of iterations I, wherein I is at least 1, until an optimization appears on the basis of the optimization parameterization, wherein a resource distribution is determined following progressive coverage of all resources in an iteration;
   if an iteration is terminated, the resource distribution is used as the target distribution;
   if the iteration is continued, a further optimization is performed in a new iteration based on the resource distribution to achieve an intermediate distribution;
   wherein the number of iterations I is dynamically adapted by comparing the optimization parameterization for the resource distribution with a target value, such that a selection of iterations I balances computational effort and optimization;
   wherein the performing movement steps includes checking whether there is an optimization for one or more movement steps each time, and if there is an optimization for a step or a chain of steps, the target distribution is changed accordingly so that a changed distribution is taken into consideration for resources considered subsequently.

10. The processing device as claimed in claim 9, wherein a weighting of an allocation of a resource to a use request is based on revenue and/or profit and/or costs and/or length of the period of use and/or position of the period of use and/or class size of the resource class of the resource and/or prioritization information.

11. The processing device as claimed in claim 9, wherein the use request is able to be met by allocating a resource of at least one other resource class.

12. The processing device as claimed in claim 9, wherein the resources are physical resources.

* * * * *